(12) United States Patent
Wahlquist et al.

(10) Patent No.: US 9,140,523 B2
(45) Date of Patent: Sep. 22, 2015

(54) METHOD AND APPARATUS FOR ARMOR HAVING INTEGRATED BATTERY POWER

(75) Inventors: Gary F. Wahlquist, McKinney, TX (US); Charles L. Horvath, Plano, TX (US); Timothy J. Imholt, Methuen, MA (US); H. Barteld VanRees, Needham, MA (US)

(73) Assignee: Raytheon Company, Waltham, MA (US)

( * ) Notice: Subject to any disclaimer, the term of this patent is extended or adjusted under 35 U.S.C. 154(b) by 41 days.

(21) Appl. No.: 13/251,691

(22) Filed: Oct. 3, 2011

(65) Prior Publication Data

US 2013/0084473 A1 Apr. 4, 2013

(51) Int. Cl.
*F41H 5/04* (2006.01)
*H01M 10/04* (2006.01)

(52) U.S. Cl.
CPC ......... *F41H 5/0421* (2013.01); *H01M 10/0413* (2013.01); *H01M 10/0436* (2013.01)

(58) Field of Classification Search
None
See application file for complete search history.

(56) References Cited

U.S. PATENT DOCUMENTS

| | | | |
|---|---|---|---|
| 6,027,835 A * | 2/2000 | Fukumura et al. | 429/233 |
| 6,507,486 B2 | 1/2003 | Peterson, III | |
| 6,571,677 B1 * | 6/2003 | Kaura | 89/36.02 |
| 7,658,139 B2 | 2/2010 | Helander | |
| 7,805,767 B2 | 10/2010 | McElroy et al. | |
| 7,921,757 B1 | 4/2011 | Vavrick et al. | |
| 2010/0115680 A1 | 5/2010 | Thomas et al. | |
| 2011/0167530 A1 | 7/2011 | Wojtowicz et al. | |
| 2011/0203181 A1 * | 8/2011 | Magner et al. | 49/324 |

FOREIGN PATENT DOCUMENTS

| | | |
|---|---|---|
| DE | 37 06 531 | 9/1988 |
| EP | 2 177 864 | 4/2010 |

OTHER PUBLICATIONS

PCT Search Report and Written Opinion of the ISA; dated Dec. 17, 2012; for PCT Pat. App. No. PCT/US2012/057005 11 pages.
Notification Concerning Transmittal of International Preliminary Report on Patentability (Chapter 1 of the Patent Cooperation Treaty), PCT/US2012/057005, date of mailing Apr. 17, 2014, 7 pages.

* cited by examiner

*Primary Examiner* — Sarah A Slifka
(74) *Attorney, Agent, or Firm* — Daly, Crowley, Mofford & Durkee, LLP

(57) ABSTRACT

Methods and apparatus for battery armor including a first ballistic protection layer comprising a non-conductive material to provide ballistic protection, and a second ballistic protection layer abutting the first ballistic protection layer, the second ballistic protection layer including a battery layer. Exemplary embodiments for battery armor include layers of non-conductive and conductive materials to provide ballistic protection and electrical power.

17 Claims, 17 Drawing Sheets

| Design | Density | Thickness | Weight |
|---|---|---|---|
| Reference | lb/in3 | in | lbs |
| RHA only | 0.284 | 0.66 | 27.0 |

| | Density | Thickness | Weight |
|---|---|---|---|
| Version 1 | lb/in3 | in | lbs |
| SiC | 0.114 | 0.04 | 6.6 |
| Steel | 0.284 | .004 | 1.6 |
| Steel | 0.284 | .004 | 1.6 |
| SiC | 0.114 | 0.04 | 6.6 |
| Steel | 0.284 | .004 | 1.6 |
| Steel | 0.284 | .004 | 1.6 |
| SiC | 0.114 | 0.04 | 6.6 |
| TOTAL | | 1.36 | 26.24 |

| Version 2, Replaced SiC with Alumina | | | |
|---|---|---|---|
| | Density | Thickness | Weight |
| | lb/in3 | in | lbs |
| Alumina | 0.141 | .04 | 8.1 |
| Steel | 0.284 | 0.04 | 1.6 |
| Steel | 0.284 | 0.04 | 1.6 |
| Alumina | 0.141 | .04 | 8.1 |
| Steel | 0.284 | 0.04 | 1.6 |
| Steel | 0.284 | 0.04 | 1.6 |
| Alumina | 0.141 | .04 | 8.1 |
| TOTAL | | 1.36 | 30.91 |

| Version 3, Alumina | | | |
|---|---|---|---|
| | Density | Thickness | Weight |
| | lb/in3 | in | lbs |
| Steel | 0.284 | 0.05 | 2.0 |
| Alumina | 0.141 | 0.25 | 5.1 |
| Steel | 0.284 | 0.05 | 2.0 |
| Steel | 0.284 | 0.05 | 2.0 |
| Alumina | 0.141 | 0.08 | 1.6 |
| Steel | 0.284 | 0.05 | 2.0 |
| Steel | 0.284 | 0.05 | 2.0 |
| Alumina | 0.141 | 0.08 | 1.6 |
| Steel | 0.284 | 0.05 | 2.0 |
| TOTAL | | 0.71 | 20.59 |

| Version 4, thin version | | | |
|---|---|---|---|
| | Density | Thickness | Weight |
| | lb/in3 | in | lbs |
| Steel | 0.284 | 0.05 | 2.0 |
| Alumina | 0.141 | 0.08 | 1.6 |
| Steel | 0.284 | 0.05 | 2.0 |
| Steel | 0.284 | 0.05 | 2.0 |
| Alumina | 0.141 | 0.08 | 1.6 |
| Steel | 0.284 | 0.05 | 2.0 |
| Steel | 0.284 | 0.05 | 2.0 |
| Alumina | 0.141 | 0.08 | 1.6 |
| Steel | 0.284 | 0.05 | 2.0 |
| TOTAL | | 0.54 | 17.14 |

| Version 5, thicker outer steel | | | |
|---|---|---|---|
| | Density | Thickness | Weight |
| | lb/in3 | in | lbs |
| Steel | 0.284 | 0.125 | 5.1 |
| Alumina | 0.141 | 0.08 | 1.6 |
| Steel | 0.284 | 0.05 | 2.0 |
| Steel | 0.284 | 0.05 | 2.0 |
| Alumina | 0.141 | 0.08 | 1.6 |
| Steel | 0.284 | 0.05 | 2.0 |
| Steel | 0.284 | 0.05 | 2.0 |
| Alumina | 0.141 | 0.08 | 1.6 |
| Steel | 0.284 | 0.125 | 5.1 |
| TOTAL | | 0.69 | 23.28 |

| Version 9, no machining | | | |
|---|---|---|---|
| | Density | Thickness | Weight |
| | lb/in3 | in | lbs |
| Steel | 0.284 | 0.1 | 4.1 |
| Steel | 0.284 | 0.1 | 4.1 |
| Alumina | 0.141 | 0.25 | 5.1 |
| Steel | 0.284 | 0.1 | 4.1 |
| Steel | 0.284 | 0.1 | 4.1 |
| TOTAL | | 0.65 | 21.43 |

METHOD AND APPARATUS FOR ARMOR HAVING INTEGRATED BATTERY POWER

BACKGROUND

As is known in the art, police, soldiers and other front line personnel can be required to carry significant amounts of gear. Various equipment, such as sensors, night vision, communication systems, flashlights, can be powered by batteries, which also must be carried by the user. In addition, since the equipment uses different battery sizes, spare batteries for each of the different equipment types must be carried. The weight associated with this equipment and batteries is significant. For example, conventional full body armor can weigh upwards of 40 pounds and a fully equipped soldier can carry almost 100 pounds of equipment including batteries.

In addition, vehicles may need battery power for various electrical loads. If the engine is not running, battery power can be used to energize at least some of the electrical loads. However, battery power can be rapidly depleted by the loads which require the engine to run generating noise and exhaust.

SUMMARY

Exemplary embodiments of the present invention provide ballistic armor, including body and vehicle armor, having integral battery layers. With this arrangement, the battery layers can provide power for powering equipment, as well as providing ballistic protection. Methods and apparatus for battery armor comprise layers of non-conductive and conductive materials to provide ballistic protection and electrical power. A battery in which the passive components comprised of armored materials form electrodes, enclosures, separators etc. That is, 'dead' armor weight can provide power from integrated battery layers that contribute to ballistic protection. Exemplary embodiments of the invention comprise armor providing battery power with ballistic protection that is comparable to conventional armor. While exemplary embodiments of the invention are primarily shown and described in conjunction with body and vehicle armor, it is understood that the invention is applicable to applications in general in which it desirable to have some level of ballistic protection with integrated battery power.

In one aspect of the invention, a system comprises a first ballistic protection layer comprising a non-conductive material to provide ballistic protection, and a second ballistic protection layer abutting the first ballistic protection layer, the second ballistic protection layer comprising: a first battery layer including: an anode layer having opposing first and second surfaces; a cathode layer having opposing first and second surfaces; and an electrolyte layer chemically coupled to the first side of the anode layer and the first side of the cathode layer; a first conductive layer abutting the second side of the anode layer, and a second conductive layer abutting the second side of the cathode layer.

The system can further include one or more of the following features: the first ballistic protection layer comprises a rigid material, the first ballistic protection layer comprises a ceramic material, the first ballistic protection layer comprises a material selected from the group consisting of ceramics such as; Alumina, Boron Carbide, Silicon Carbide, and Titanium Diboride, the first conductive layer comprises a metal, the first conductive layer comprises steel, the system comprises a second battery layer electrically coupled to the first battery layer, wherein the first ballistic protection layer is disposed between the first and second batteries, the system comprises body armor, the system comprises vehicle armor, the system comprises exoskeleton armor, the system comprises an armor tile configured to engage a further armor tile, and/or a sealant layer abutting the first ballistic protection layer.

In another aspect of the invention, a vehicle comprises an electrical system including a power distribution module, and vehicle armor including a battery coupled to the power distribution module, the vehicle armor comprising: a first ballistic protection layer comprising a non-conductive material to provide ballistic protection, and a second ballistic protection layer abutting the first ballistic protection layer, the second ballistic protection layer comprising: a first battery layer including: an anode layer having opposing first and second surfaces; a cathode layer having opposing first and second surfaces, and an electrolyte layer chemically coupled to the first side of the anode layer and the first side of the cathode layer, a first conductive layer abutting the second side of the anode layer, and a second conductive layer abutting the second side of the cathode layer.

BRIEF DESCRIPTION OF THE DRAWINGS

The foregoing features of this invention, as well as the invention itself, may be more fully understood from the following description of the drawings in which.

DETAILED DESCRIPTION

Before describing exemplary embodiments of the invention, some information is provided. As is known in the art, an electrical battery includes one or more electrochemical cells that convert chemical energy into electrical power. A battery comprises a number of voltaic cells, each having two half cells connected in series by a conductive electrolyte containing anions and cations. One half-cell includes electrolyte and the electrode to which anions (negatively charged ions) migrate, i.e., the anode or negative electrode. The other half-cell includes electrolyte and the electrode to which cations (positively charged ions) migrate, i.e., the cathode or positive electrode. In the reaction that powers the battery, cations are reduced (electrons are added) at the cathode, while anions are oxidized (electrons are removed) at the anode. The electrodes are chemically connected by the electrolyte. Each half cell has an electromotive force (emf) driving electric current from the interior to the exterior of the cell. The net emf of the cell is the difference between the emfs of its half-cells. The electrical driving force across the terminals of a cell is known as the terminal voltage.

Figure 1:
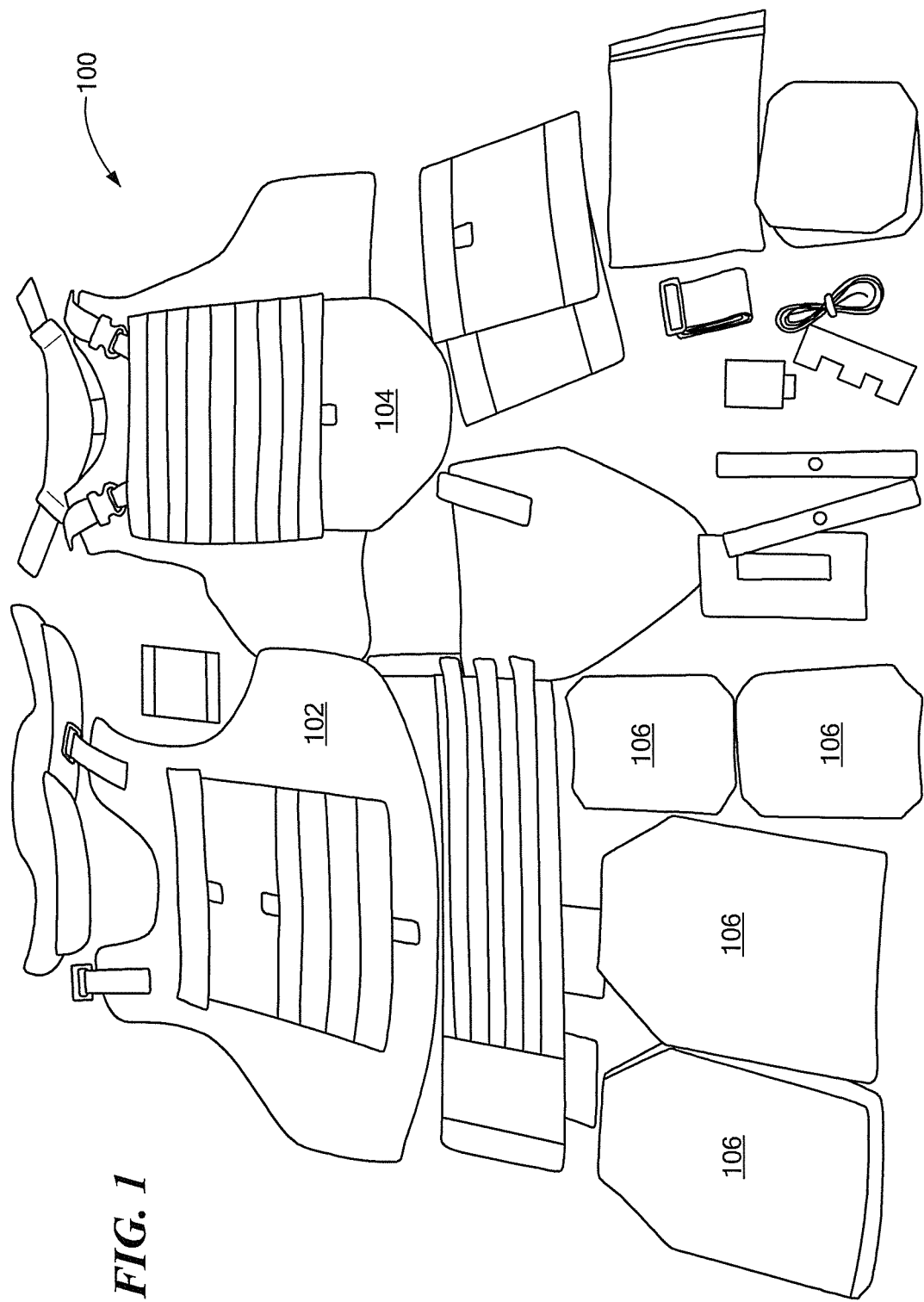
FIG. 1 is a pictorial representation of an exemplary body armor having ballistic protection layers that form a battery.

FIG. 1 shows an exemplary body armor system 100 having battery layers formed from ballistic resistant materials in accordance with exemplary embodiments of the invention, as shown and described more fully below. In general, the battery layers contribute to the body armor function of the system to protect a wearer from projectiles, while also providing energy to power equipment. The body armor system 100 includes front 102 and back 104 protectors that are configured to hold removable armor plates 106.

The body armor ceramic plates 106 are backed by ballistic composite materials fabricated into what is commonly referred to as "bullet-proof vests." The ceramic plates 106 are hard and dense, and known as "Small Arms Protective Insert" (SAPI) plates that shatter and fragment incoming projectiles, such as bullets. The ceramic plates 106 can be backed by ballistic composite material vests made of KEVLAR, SPECTRA/DYNEEMA, TWARON, or S-2 glass (fiberglass). The composite material reinforces the back side of the ceramic tile and catches any bullet or ceramic fragments penetrating through the plates.

While exemplary embodiments of the invention are shown and described in conjunction with body armor for military and law enforcement personnel, it is understood that embodiments of the invention are applicable to systems in general in which it is desirable to provide integrated user protection and battery power.

Figure 2:
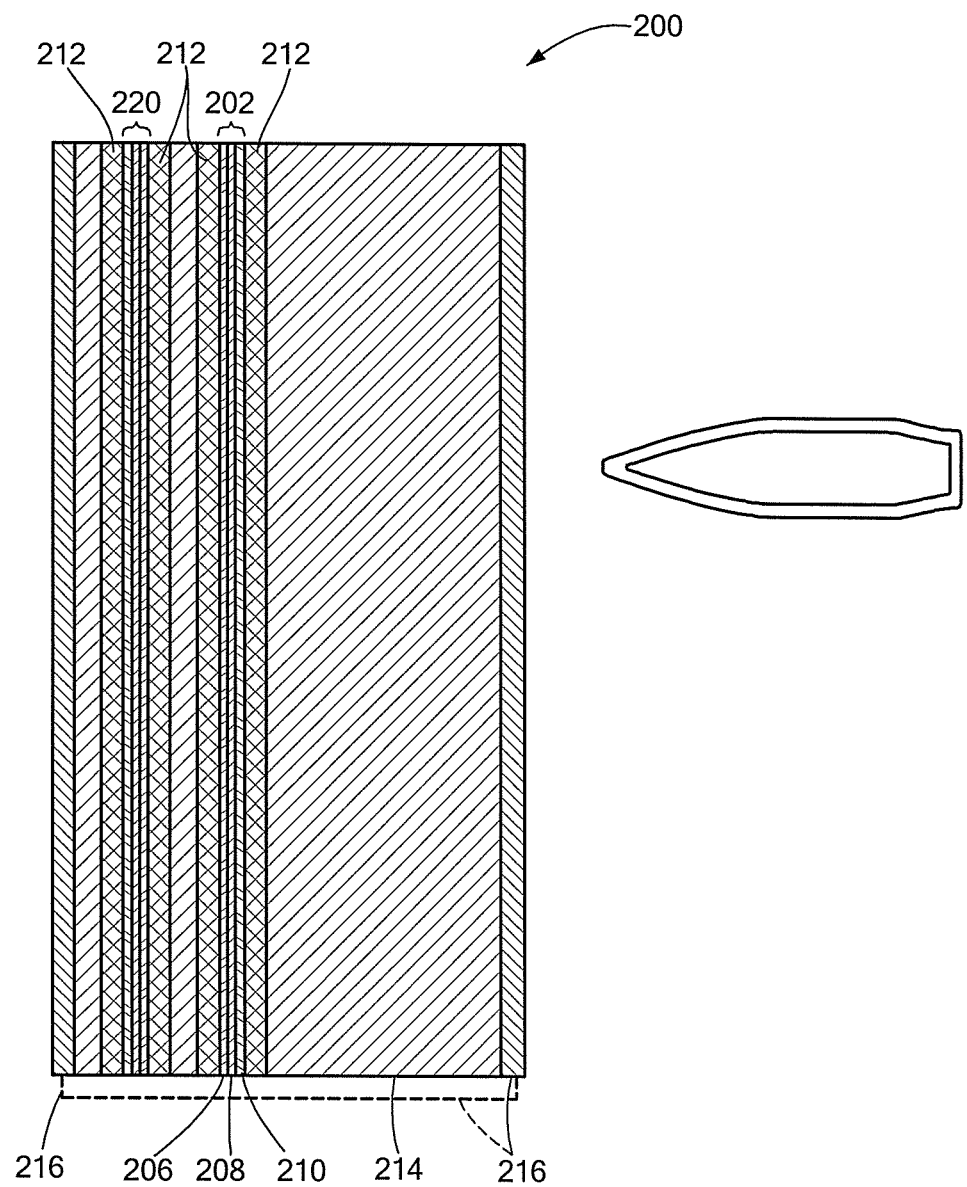
FIG. 2 is a schematic representation of an exemplary stackup for body armor having integrated battery layers.

FIG. 2 shows an exemplary stack up (not to scale) for body armor 200 including a battery 202 with integral battery layers for providing ballistic protection to protect a wearer from projectiles, such as a bullet 10, in accordance with exemplary embodiments of the invention. By integrating one or more batteries into the body armor system 200, the need for carrying discrete batteries to power equipment may be reduced.

A first battery 202 includes a cathode 206, an electrolyte 208, and an anode 210. In one embodiment, an electrically conductive layer 212 abuts the cathode 206 and anode 210. The electrically conductive layer 212 can comprise steel forming electrical contact with anodic and cathodic materials and can be effective to transfer heat away from the battery, as well as contribute to ballistic protection. It is understood that the figures contained herein are not to scale.

In an exemplary embodiment, a non-conductive ballistic protection layer 214 provides significant ballistic protection against projectiles 10. In one embodiment, the ballistic protection layer comprises a ceramic layer, such as Alumina or Silicon Carbide. Other ballistic protection materials will be readily apparent to one of ordinary skill in the art. The body armor system 200 can include an optional seal layer 216. The seal can be formed from metals or plastics to serve as an environmental cover, for example.

In one embodiment, the seal 216 is operative to contain the ceramic material upon impact by a projectile. Upon impact, the ceramic material may shatter into many pieces. The seal 216 maintains the ceramic material in place to maintain at least some degree of ballistic protection. Various metal, polymer, plastic, and other materials suitable for the seal will be readily apparent to one of ordinary skill in the art.

In one embodiment, the body armor system 200 includes a second battery 220. Multiple batteries can be separated by a non-conductive material, such as ballistic protection layer 214. It is understood that any practical number of batteries can be used to meet the needs of a particular application. It is understood that any practical number of cells can be added in series and parallel arrangements to meets the needs of a particular application. Exemplary considerations include ballistic protection requirements, battery voltage requirements, available space/thickness configurations, and the like.

Exemplary ballistic protection materials include Alumina ($0.10^{14}$ ohm-cm resistivity), Boron Carbide ($10^1$ ohm-cm resistivity), Silicon Carbide ($10^6$ ohm-cm resistivity), and Titanium Diboride ($10^{-5}$ ohm-cm resistivity).

In embodiment, battery layers range in thickness from about 0.08" to about 0.5" and steel layers range from about 0.04" to about 0.125". It is understood that layer thickness can vary outside of these ranges to meet the needs of a particular application. In addition, for multiple battery cells, each battery cell may have varying thicknesses and/or materials.

Figure 3:
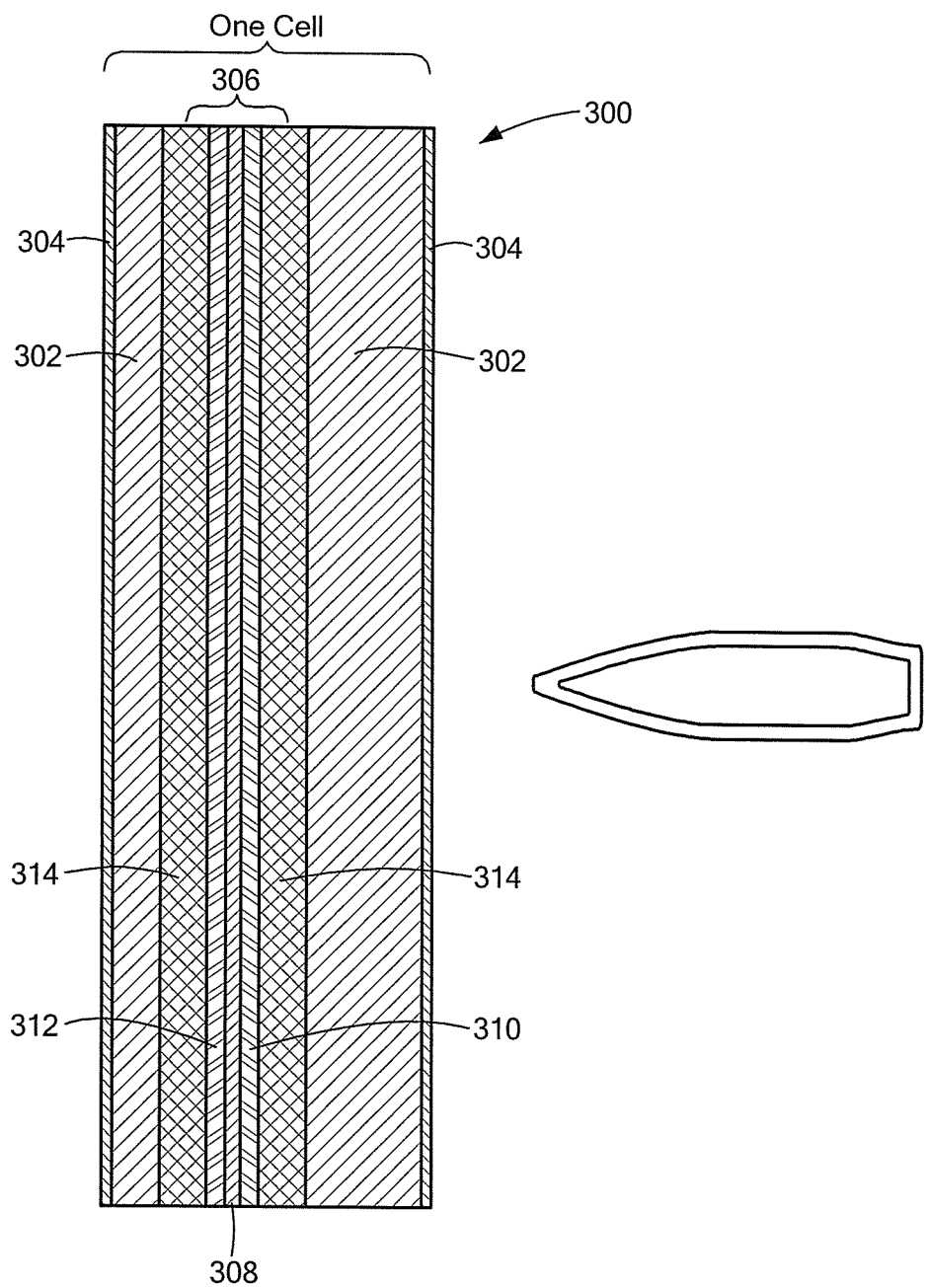
FIG. 3 is a schematic representation of an exemplary stackup for body armor having integrated battery layers.

FIG. 3 shows an exemplary single battery cell configuration 300 having non-conductive ceramic layers 302 with optional seal layers 304 to provide an environmental seal for the battery. Any suitable steel, plastic or other material can be used for the seal layers 304.

A battery 306 comprises an electrolyte 308 between an anode layer 310 and a cathode layer 312. In one embodiment, the battery 306 is sandwiched between hard, conductive layers 314, such as steel, e.g., rolled homogenous armor (RHA) or high hardened steel (HHS). In other embodiments, conductive composite materials can provide the conductive layer 314.

In one particular embodiment, the cathode layer 312 comprises Lithium-manganese dioxide (LiMnO2) about 100 micrometers in thickness, the anode layer 310 comprises graphite about 100 micrometers in thickness, and the electrolyte layer 308 comprises ceramic about 50 micrometers in thickness. In an alternative embodiment, the electrolyte comprises glass. In general, the electrolyte can comprise any suitable polymer, gel, ceramic, etc. In a further alternative embodiment, the cathode layer 312 comprises Lithium Iron Phosphate (LiFePO4). It is understood that drawings may not be to scale.

Figure 3A:
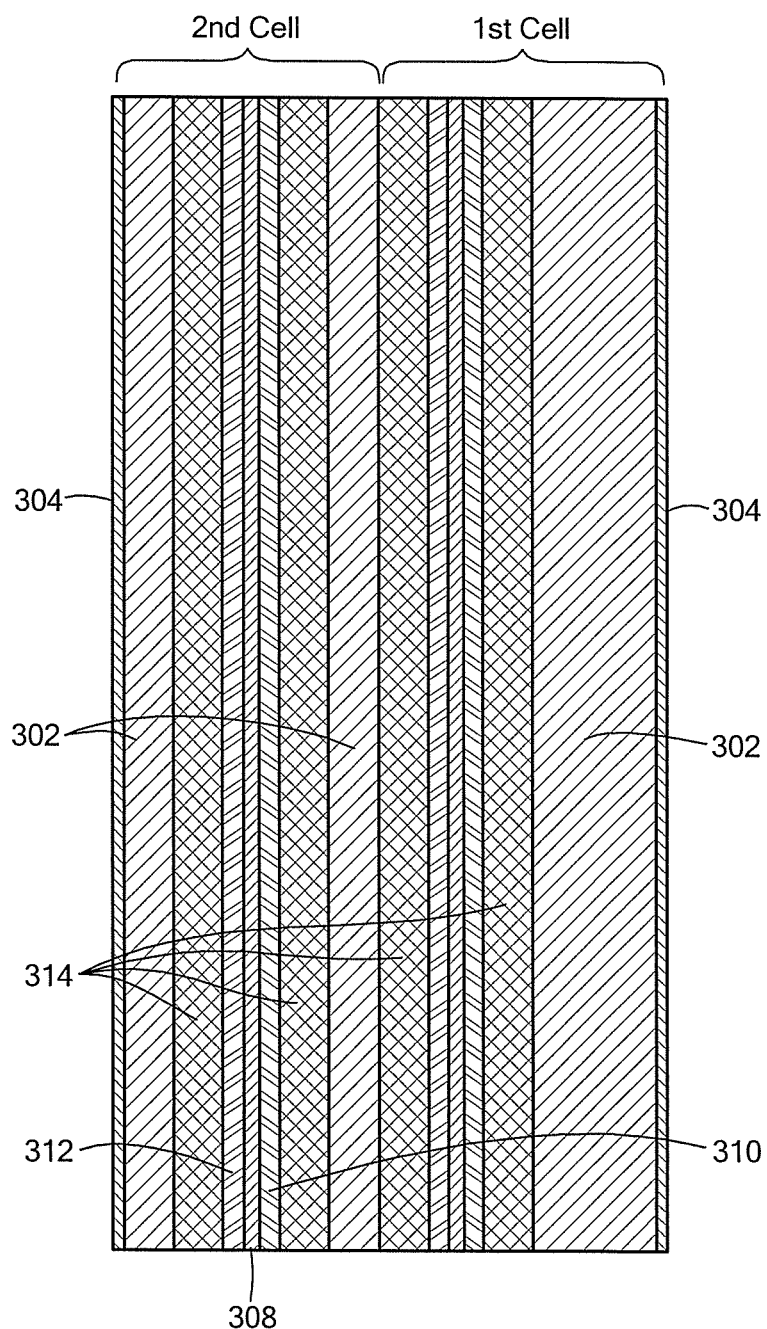
FIG. 3A is a schematic representation of a multi-cell embodiment for the body armor of FIG. 3.

FIG. 3A shows a second cell 320 added to the configuration of FIG. 3 to provide a two-cell configuration 300. It is understood that any practical number of cells can be added in series and parallel arrangements to meets the needs of a particular application.

Figures 4, 4A:
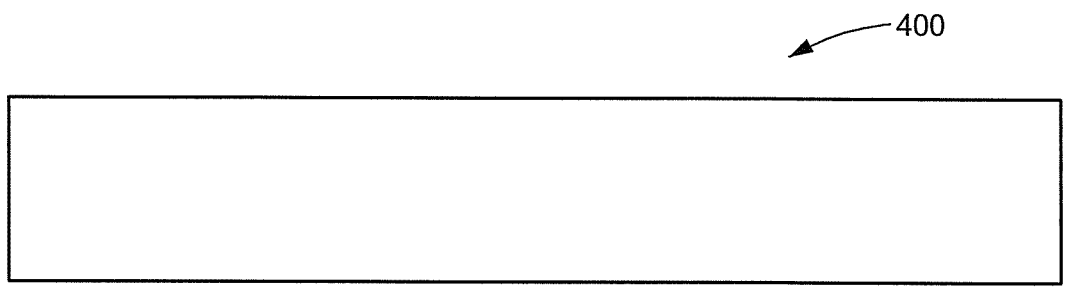
FIG. 4 is a schematic representation of a plate of rolled homogeneous armor (RHA)
FIG. 4A is a tabular representation showing characteristics for the plate of FIG. 4.
Figure 4B:
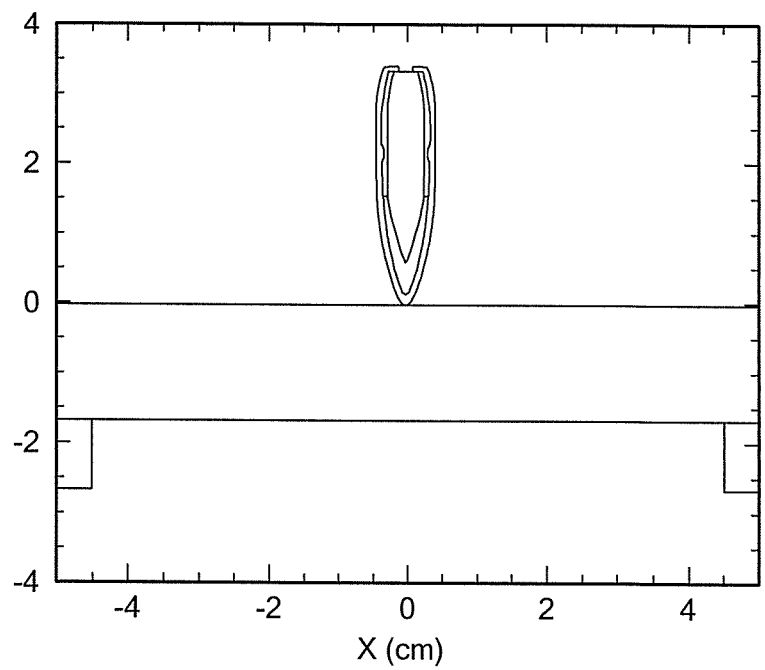
FIG. 4B is a graphical representation of RHA before impact for the plate of FIG. 4.
Figure 4C:
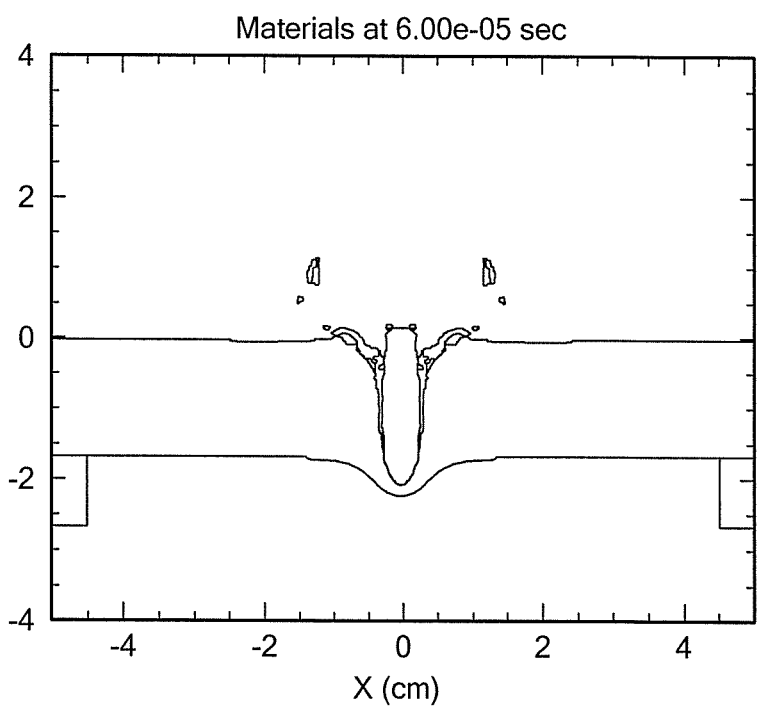
FIG. 4C is a graphical representation of RHA after impact for the plate of FIG. 4.

FIG. 4 shows an exemplary plate 400 of rolled homogenous armor (RHA) having a thickness of 0.66 inch and a density of 0.284 lb/in$^3$, as shown in FIG. 4A. The RHA plate has a reference weight of 27 lbs/ft$^2$. FIG. 4B shows the RHA plate before impact. FIG. 4C shows the RHA plate after impact.

Figures 5, 5A:
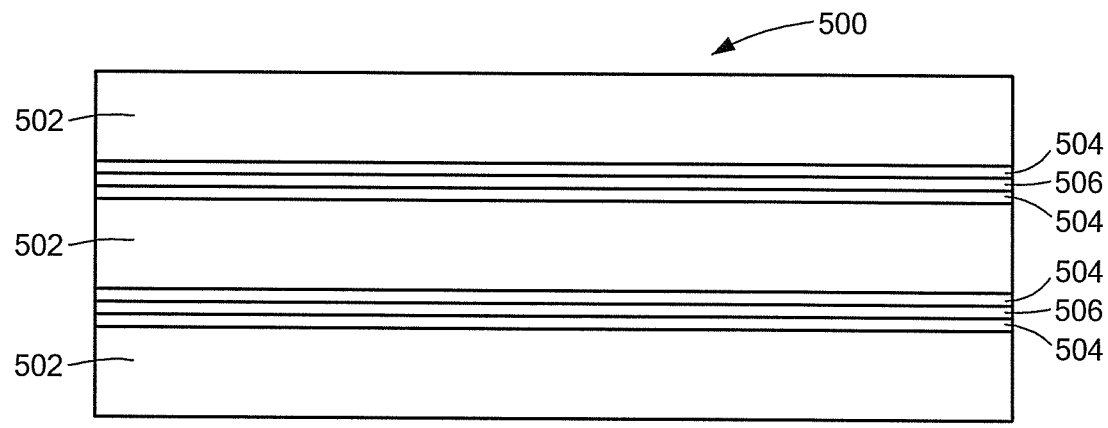
FIG. 5 is a schematic representation of an exemplary stackup for armor having integrated battery layers.
FIG. 5A is a tabular representation showing characteristics for the stackup of FIG. 5.

FIG. 5 shows an exemplary two cell stackup 500 for exemplary battery armor in accordance with exemplary embodiments of the invention. FIG. 5A lists exemplary density, thickness, and weight values. The cell comprises SiC layers 502 separated by steel layers 504 that contribute to ballistic protection, as well as battery power generation. Batteries 506, such as battery 306 of FIG. 3, are disposed between the steel layers 504.

Figures 6, 6A:
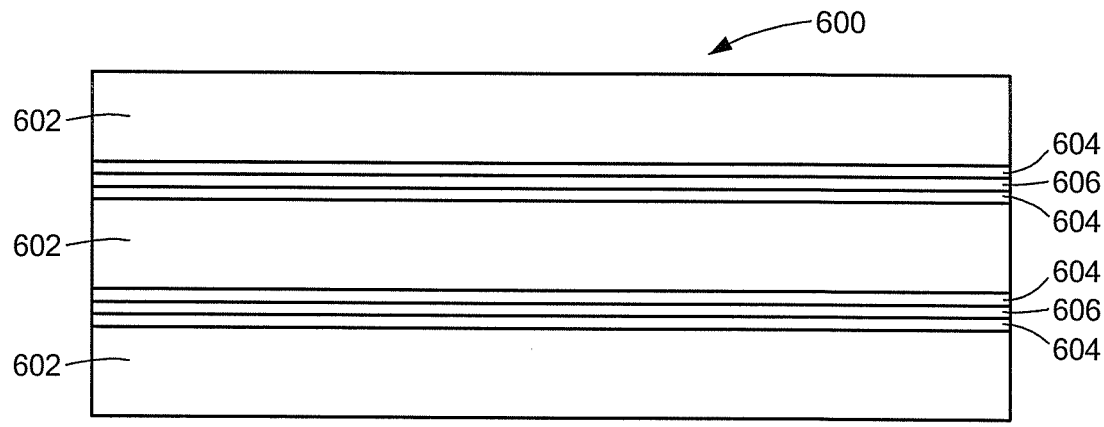
FIG. 6 is a schematic representation of an exemplary stackup for armor having integrated battery layers.
FIG. 6A is a tabular representation showing characteristics for the stackup of FIG. 6.

FIG. 6 shows another exemplary two-cell stackup 600 having layers of alumina 602 and layers of steel 604 with exemplary densities, thicknesses, and weights, listed in FIG. 6A. Batteries 606 are disposed between the steel layers 604.

Figures 7, 7A:
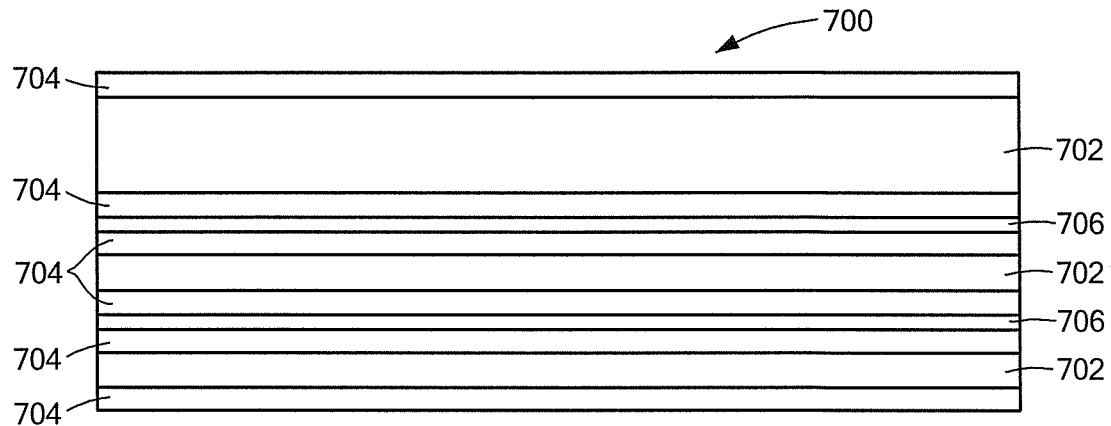
FIG. 7 is a schematic representation of an exemplary stackup for armor having integrated battery layers.
FIG. 7A is a tabular representation showing characteristics for the stackup of FIG. 7.
Figure 7B:
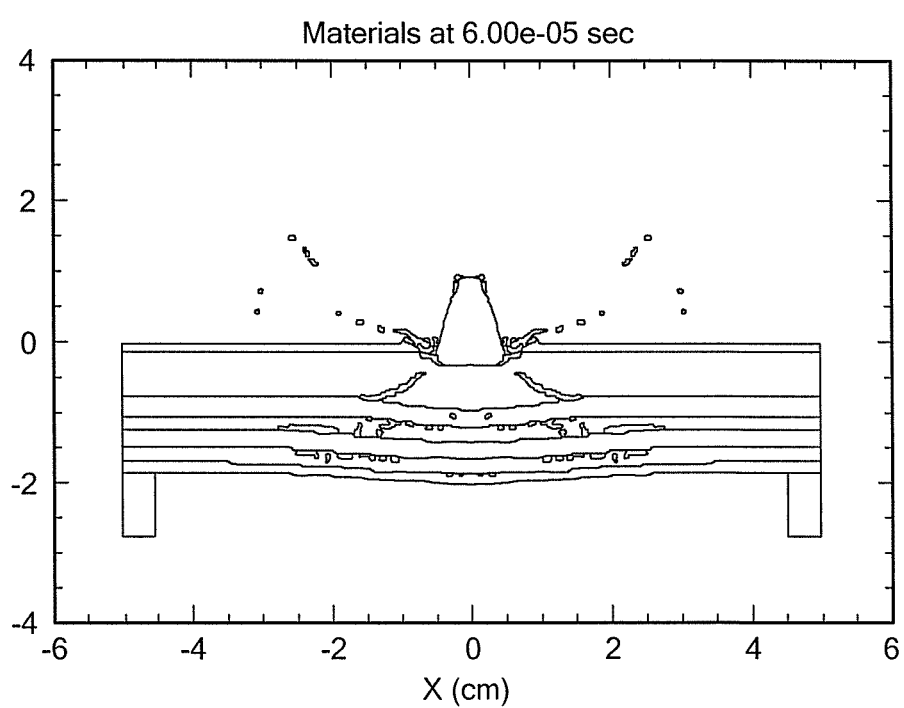
FIG. 7B is a graphical representation of ballistic performance for the stackup of FIG. 7.

FIG. 7 shows a further exemplary two-cell stackup 700 having layers of steel 704 and alumina 702 with densities, thicknesses and weights listed in FIG. 7A. Batteries 706 are located between the steel layers 704. The ballistic performance of the cell is shown in FIG. 7B.

Figures 8, 8A:
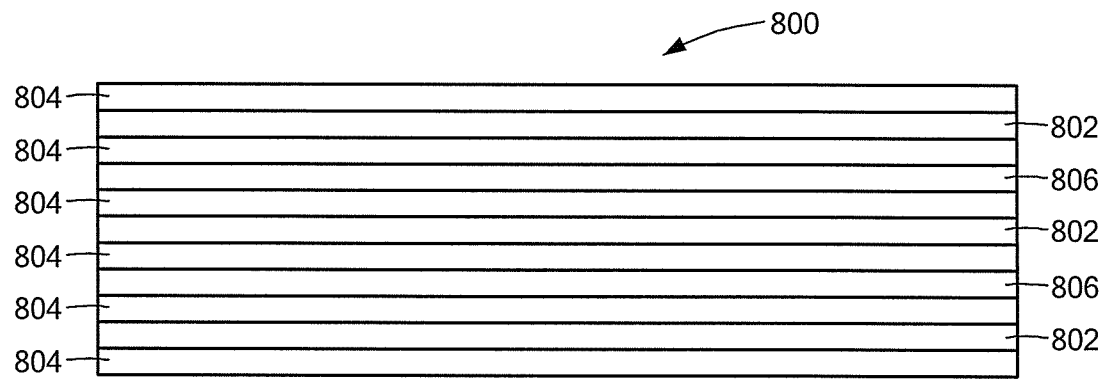
FIG. 8 is a schematic representation of an exemplary stackup for armor having integrated battery layers.
FIG. 8A is a tabular representation showing characteristics for the stackup of FIG. 8.
Figure 8B:
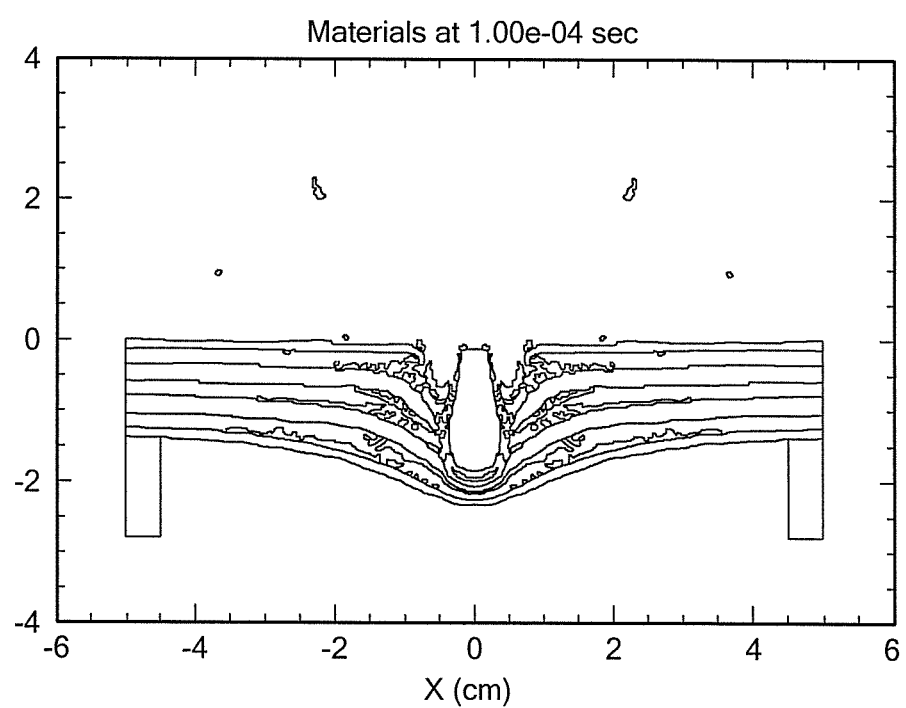
FIG. 8B is a graphical representation of ballistic performance for the stackup of FIG. 8.

FIG. 8 shows another exemplary two-cell stackup 800 having steel 804 and alumina 802 layers with densities, thicknesses and weights listed in FIG. 8A. Batteries 806 are provided between the steel layers 804. FIG. 8B shows the ballistic protection provided by the stackup 800 of FIG. 8.

Figures 9, 9A:
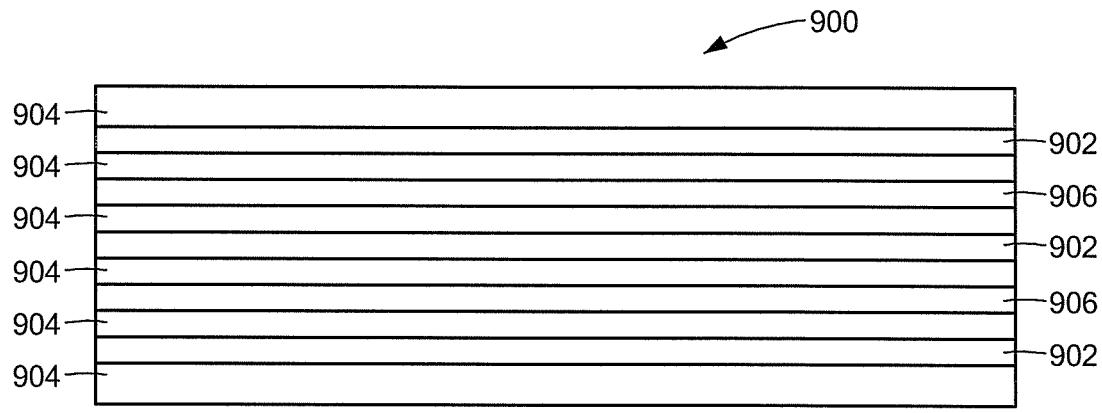
FIG. 9 is a schematic representation of an exemplary stackup for armor having integrated battery layers.
FIG. 9A is a tabular representation showing characteristics for the stackup of FIG. 9.

FIG. 9 shows a further exemplary cell 900 having steel and alumina layers as listed in Table 5 below. As can be seen, the cell of FIG. 9 has a thicker outer steel layer as compared to FIG. 8.

Figures 10, 10A:
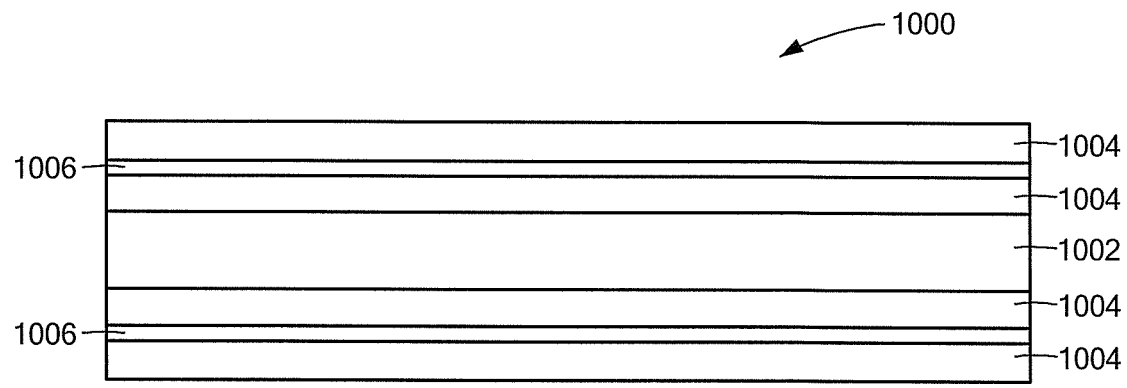
FIG. 10 is a schematic representation of an exemplary stackup for armor having integrated battery layers.
FIG. 10A is a tabular representation showing characteristics for the stackup of FIG. 10.
Figure 10B:
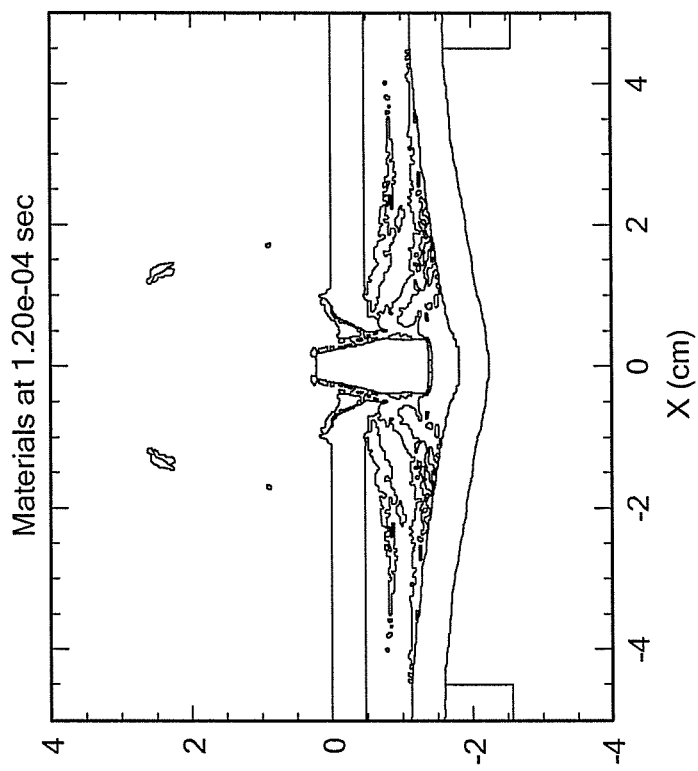
FIG. 10B is a graphical representation of ballistic performance for the stackup of FIG. 10.

FIG. 10 shows another exemplary alumina/steel cell 1000 with densities, thicknesses and weights listed in FIG. 10A. Steel layers 1004, alumina layers 1002, and batteries 1006 provide a two-cell stackup. As described more fully below, the cell 1000 of FIG. 10 is well suited for vehicle armor. FIG. 10B shows exemplary ballistic protection provided by the cell 1000 of FIG. 10.

In exemplary embodiments, layers in the stackup can be bonded together using a variety of techniques well known to one of ordinary skill in the art, including adhesives and metallization. It is further understood that the batteries can be provided as non-rechargeable or rechargeable. It is further understood that battery armor embodiments are applicable to a wide range of applications in which additional battery power is desirable. In addition, while the term armor is used herein, it is understood that batteries can be incorporated into existing structures, such as metal structures in vehicles, aircraft, ocean vessels and the like.

Figure 11:
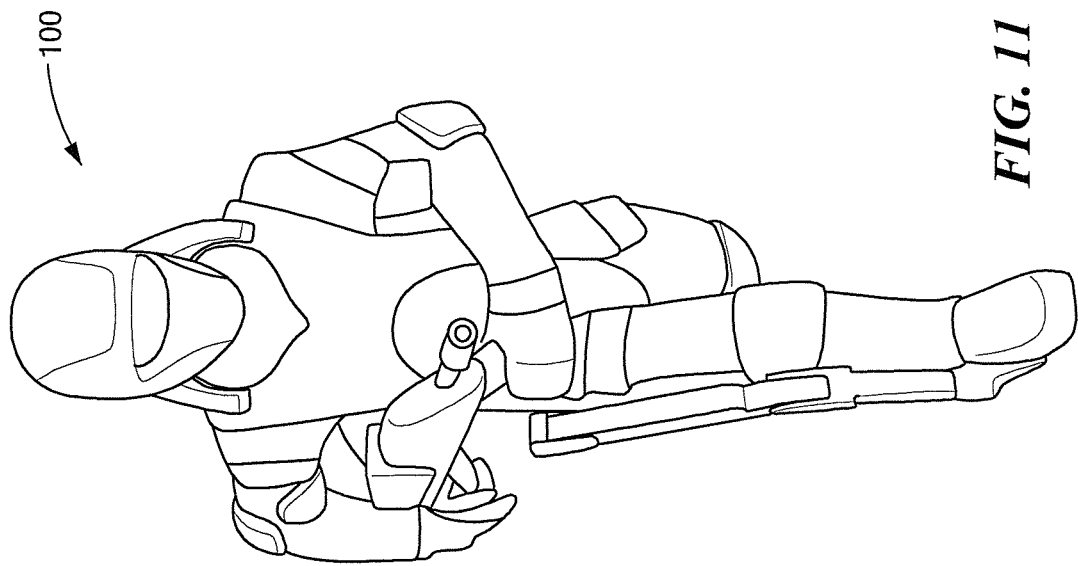
FIG. 11 is a pictorial representation of an exemplary exoskeleton having integrated body armor in accordance with exemplary embodiments of the invention.
Figure 12:
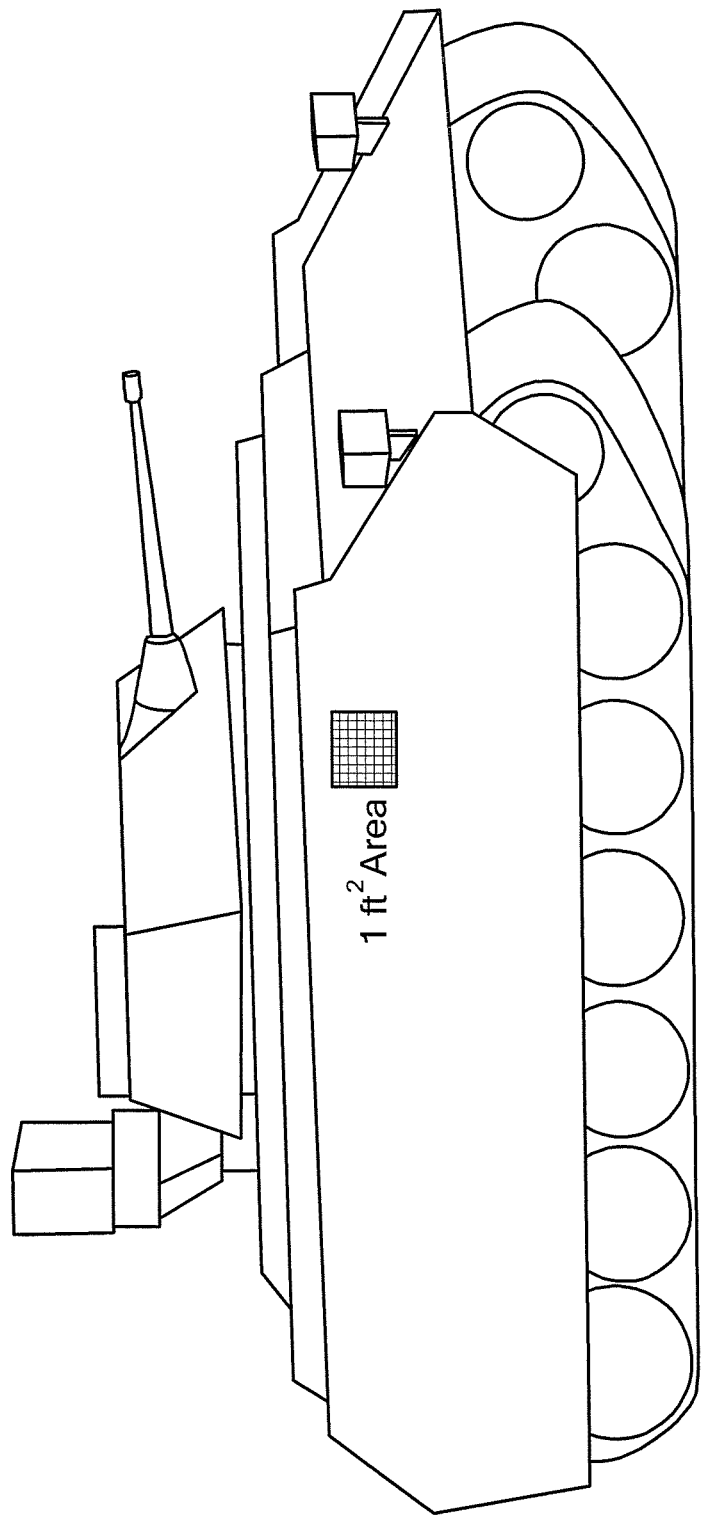
FIG. 12 is a pictorial representation of a vehicle having integrated vehicle armor in accordance with exemplary embodiments of the invention.

FIG. 11 shows an exoskeleton 1100 having body armor in accordance with exemplary embodiments of the invention. FIG. 12 shows an exemplary vehicle 1200, shown here as an armored vehicle, having battery armor providing power in addition to conventional power supplies. For example, vehicle battery armor can comprise four cells stacked in a one square foot area to provide 50 amp-hours of capacity.

Figure 13:
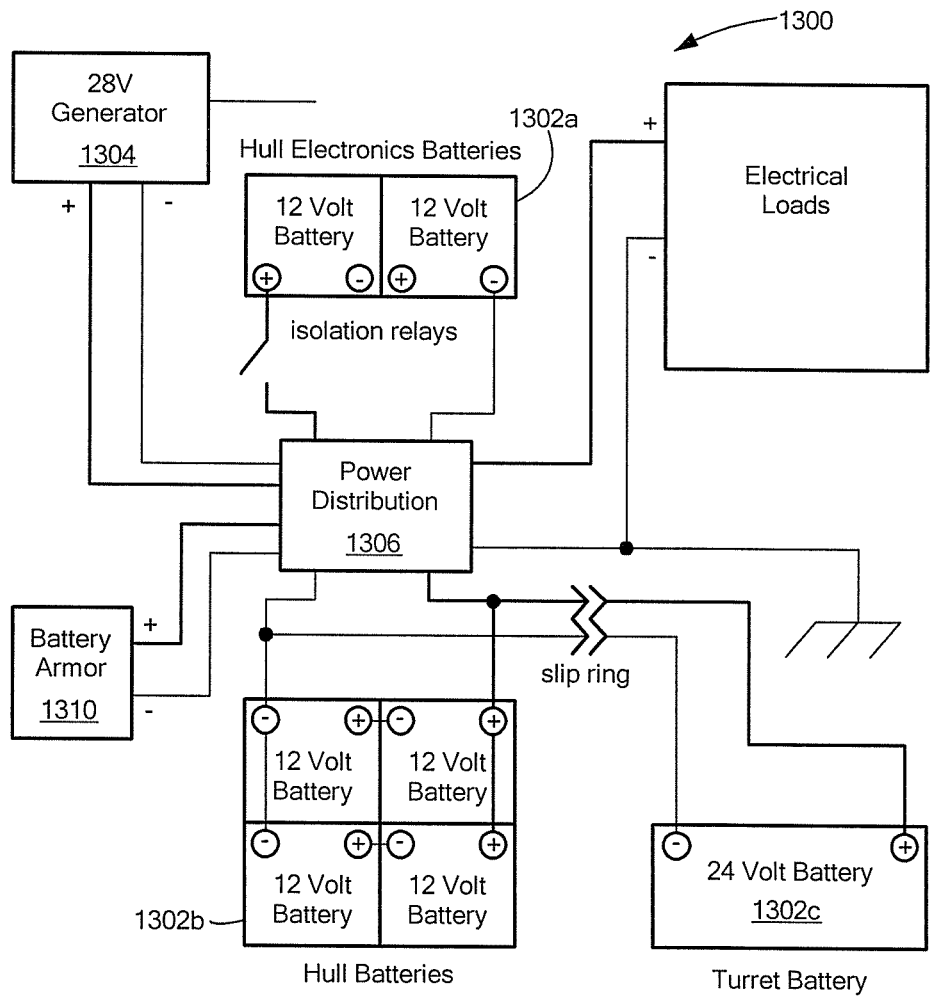
FIG. 13 is a schematic representation of an exemplary circuit for an electrical system including power from armor having integrated battery layers.

FIG. 13 shows an exemplary system 1300 having a series of batteries 1302a, 1302b, 1302c and a generator 1304 feeding power to a power distribution module 1306, which provides power to the various electrical loads 1308. The system also includes battery armor 1310 providing power to the power distribution module 1306. As will be readily appreciated, by providing additional battery power in the vehicle armor with minimal impact to ballistic protection, vehicle performance is enhanced.

Figure 14:
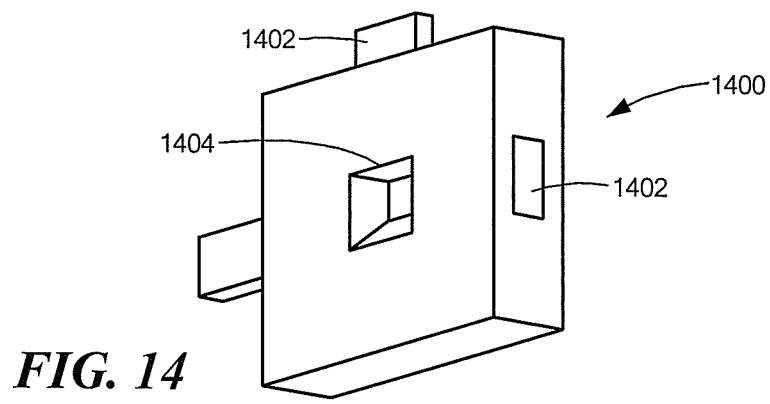
FIG. 14 is a schematic representation of an exemplary armor tile having integrated battery layers in accordance with exemplary embodiments of the invention.

FIG. 14 shows an exemplary battery armor tile 1400 having exemplary electrical connectors 1402 that provide electrical connections between adjacent tiles. The connectors 1402 can also provide structural connection between tiles to form an integrated structure. A further connector 1404 can be provided to enable stacking of tiles.

While exemplary embodiments of the battery armor are generally flat, the armor can have some curvature to conform to body armor shaping and vehicle features. It is understood that the armor comprises battery layers. As used herein, the term "layer" for the battery anode, cathode and electrolyte layers refer to a thickness of some material on a surface, where the layer has a thickness to area ratio (where area is the area of overlapping armor and battery) of less than 0.02. For example, for 10 inches by 10 inches of armor, the battery layer thickness is less than 2 inches.

In exemplary embodiments, the inventive battery armor is scalable so that adding cells increases power to desired levels while meeting constraints, such as weight, size, etc. Electronic devices, such as radios that require different voltages, can be powered by reconnecting cells to achieve the appropriate voltage. Battery armor embodiments can be reconfigurable to achieve multiple voltage and power capacities within one plate. Cells in the battery armor can be configured so that if one cell is damaged, other cells still provide power.

It will be appreciated that battery body armor for soldiers, robots, and exoskeleton systems, should be as lightweight and thin as possible while minimizing backside deflection, which can injure the wearer or equipment. In general, the thickest layers of the battery armor are located on the outer surface in order to stop the projectile and minimize penetration.

In general, battery vehicle armor will be significantly thicker than battery body armor embodiments. The battery vehicle armor should be as thick as desired with acceptable weight. The battery vehicle armor covers surfaces of the vehicle to provide ballistic protection comparable to conventional armor, as well as providing battery power. Penetration of the armor is tolerable as long as the inner surface of the armor is not the internal surface of the vehicle. In addition, the armor should provide the proper voltage even if some cells are damaged.

In another embodiment, an unmanned vehicle includes armor whose components are the battery. For example, an unmanned explosive detonation robot can comprise armor having integrated battery layers to extend the operational time of the robot between charges or battery swap. In another embodiment, a robotic soldier can comprise armor having integrated battery layers.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A body armor system, comprising:
an armor stack, comprising:
a first ballistic protection layer having opposing first and second surfaces, the first ballistic protection layer comprising a non-conductive material to provide ballistic protection; and
a second ballistic protection layer having opposing first and second surfaces wherein the second surface of the first ballistic protection layer is disposed over the first surface of the second ballistic protection layer, the second ballistic protection layer comprising:
a first battery layer having opposing first and second surfaces, the first battery layer including:
an anode layer having opposing first and second surfaces;
a cathode layer having opposing first and second surfaces;
an electrolyte layer chemically coupled to the second surface of the anode layer and the first surface of the cathode layer;
a first conductive layer abutting the first surface of the anode layer; and
a second conductive layer abutting the second surface of the cathode layer,
wherein the first conductive layer and the second conductive layer comprise steel having a thickness of at least 0.04 inches to form electrical contact with the respective anode layer and the cathode layer, transfer heat away from the respective anode layer and the cathode layer, and contribute to ballistic protection of the second ballistic protection layer, wherein the first ballistic protection layer, the second ballistic protection layer, and the first battery layer in the armor stack provide a continuous armor layer without the first battery layer being disposed in a cavity of the first ballistic protection layer.

2. The system according to claim 1, wherein the first ballistic protection layer comprises a substantially rigid material.

3. The system according to claim 1, wherein the first ballistic protection layer comprises a ceramic material.

4. The system according to claim 1, wherein the first ballistic protection layer comprises a material that includes Alumina, Boron Carbide, Silicon Carbide, and/or Titanium Diboride.

5. The system according to claim 1, wherein the system comprises a second battery layer electrically coupled to the first battery layer, wherein the first ballistic protection layer is disposed between the first and second batteries.

6. The system according to claim 1, wherein the system comprises battery body armor.

7. The system according to claim 1, wherein the system comprises battery vehicle armor.

8. The system according to claim 1, wherein the system comprises battery exoskeleton armor.

9. The system according to claim 1, wherein the system comprises a battery armor tile configured to engage a further battery armor tile.

10. The system according to claim 1, further including a seal layer abutting an outer surface of the first ballistic protection layer.

11. A vehicle, comprising:
an electrical system including a power distribution module; and
battery vehicle armor including a battery coupled to the power distribution module, the battery vehicle armor comprising:
an armor stack, comprising:
a first ballistic protection layer having opposing first and second surfaces, the first ballistic protection layer comprising a non-conductive material to provide ballistic protection; and
a second ballistic protection layer having opposing first and second surfaces wherein the second surface of the first ballistic protection layer is disposed over the first surface of the second ballistic protection layer, the second ballistic protection layer comprising:
a first battery layer having opposing first and second surfaces, the first battery layer including:
an anode layer having opposing first and second surfaces;
a cathode layer having opposing first and second surfaces;
an electrolyte layer chemically coupled to the second surface of the anode layer and the first surface of the cathode layer;
a first conductive layer abutting the first surface of the anode layer; and
a second conductive layer abutting the second surface of the cathode layer,
wherein the first conductive layer and the second conductive layer comprise steel having a thickness of at least 0.04 inches to form electrical contact with the respective anode layer and the cathode layer, transfer heat away from the respective anode layer and the cathode layer, and contribute to ballistic protection of the second ballistic protection layer, wherein the first ballistic protection layer, the second ballistic protection layer, and the first battery layer in the armor stack provide a continuous armor layer without the first battery layer being disposed in a cavity of the first ballistic protection layer.

12. The vehicle according to claim 11, wherein the battery vehicle armor comprises tiles.

13. The system according to claim 1, wherein the system further includes front and back protectors configured to hold removable armor plates.

14. The system according to claim 1, wherein the battery layer has a thickness ranging from about 0.08 inch to about 0.5 inch.

15. The system according to claim 1, wherein the cathode layer comprises Lithium manganese dioxide ($LiMnO_2$).

16. The system according to claim 1, wherein the anode layer comprises graphite.

17. A body armor system, comprising:
an armor stack having opposing first and second surfaces, the armor stack comprising:
a first steel layer having opposing first and second surfaces, wherein the first surface of the first steel layer corresponds to the first surface of the armor stack;
a first ballistic protection layer having opposing first and second surfaces, wherein the first surface of the first ballistic protection layer is disposed over the second surface of the first steel layer, the first ballistic protection layer comprising a non-conductive material to provide ballistic protection;
a second ballistic protection layer having opposing first and second surfaces, wherein the first surface of the second ballistic protection layer is disposed over the second surface of the first ballistic protection layer, the second ballistic protection layer comprising:
a stack of at least two battery layers, with each of the at least two battery layers having opposing first and second surfaces, wherein the first surface of a first one of the at least two battery layers corresponds to the first surface of the second ballistic protection layer and the stack of the at least two battery layers are stacked on top of each other relative to the second surface of the first ballistic protection layer such that the second surface of the first one of the at least two battery layers is disposed over the first surface of a second one of the at least two battery layers, each of the at least two battery layers including:
  a battery having opposing first and second surfaces, the battery including:
    an anode layer having opposing first and second surfaces;
    a cathode layer having opposing first and second surfaces; and
    an electrolyte layer chemically coupled to the second surface of the anode layer and the first surface of the cathode layer;
  a first conductive layer having opposing first and second surfaces, the second surface of the first conductive layer disposed over the first surface of the battery, wherein the first surface of the first conductive layer corresponds to the first surface of each of the battery layers; and
  a second conductive layer having opposing first and second surfaces, the first surface of the second conductive layer disposed over the second surface of the battery, wherein the second surface of the second conductive layer corresponds to the second surface of each of the battery layers;
a ballistic protection material disposed between each of the battery layers in the stack of at least two battery layers, the ballistic protection layer having opposing first and second surfaces, Wherein the first and second surfaces of the ballistic protection material are disposed over abutting surfaces of corresponding battery layers;
a third ballistic protection layer having opposing first and second surfaces, wherein the first surface of the third ballistic protection layer is disposed over the second surface of a last one of the at least two battery layers, the third ballistic protection layer comprising a non-conductive material to provide ballistic protection; and
a second steel layer having opposing first and second surfaces, wherein the first surface of the second steel layer is disposed over the second surface of the third ballistic protection layer and the second surface of the second steel layer corresponds to the second surface of the armor stack,
wherein the first conductive layer and the second conductive layer of each of the battery layers comprise steel having a thickness of at least 0.04 inches to form electrical contact with the respective anode layer and the cathode layer, transfer heat away from the respective anode layer and the cathode layer, and contribute to ballistic protection of the second ballistic protection layer, wherein the first steel layer, the first ballistic protection layer, the second ballistic protection layer, the at least two battery layers, the third ballistic protection layer and the second steel layer in the armor stack provide a continuous armor layer without the at least two battery layers being disposed in a cavity of the first ballistic protection layer.

* * * * *